United States Patent
Katou et al.

(10) Patent No.: US 7,765,562 B2
(45) Date of Patent: Jul. 27, 2010

(54) OPTICAL DISC APPARATUS WITH CONSISTENTLY DIFFERING GUIDE SHAFTS

(75) Inventors: Yukio Katou, Odawara (JP); Yoshiaki Yamauchi, Omitama (JP); Ikuo Nishida, Ebina (JP); Kouhei Takita, Mitaka (JP); Seiichi Katou, Tsuchiura (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 623 days.

(21) Appl. No.: 11/512,117

(22) Filed: Aug. 30, 2006

(65) Prior Publication Data

US 2007/0127324 A1  Jun. 7, 2007

(30) Foreign Application Priority Data

Dec. 6, 2005 (JP) ............................. 2005-352554

(51) Int. Cl.
*G11B 7/00* (2006.01)
(52) U.S. Cl. ...................................... 720/688
(58) Field of Classification Search ................ 720/688, 720/676, 678, 679
See application file for complete search history.

(56) References Cited

U.S. PATENT DOCUMENTS

| 5,313,446 | A  | * | 5/1994 | Tokano et al. ............... 369/111 |
| 6,351,445 | B1 |   | 2/2002 | Ng et al. |
| 7,352,679 | B2 | * | 4/2008 | Ohno ......................... 369/223 |
| 7,418,723 | B2 | * | 8/2008 | Nishida et al. ............. 720/662 |
| 2005/0034142 | A1 | * | 2/2005 | Park et al. ................... 720/676 |
| 2005/0114878 | A1 | * | 5/2005 | Nishida et al. ............. 720/676 |
| 2005/0198660 | A1 | * | 9/2005 | Kim et al. ................... 720/679 |

FOREIGN PATENT DOCUMENTS

| JP | 64-15364    |   | 1/1989 |
| JP | 06259895 A  | * | 9/1994 |
| JP | 2000-311366 |   | 11/2000 |
| JP | 2002-008250 |   | 1/2002 |
| JP | 2003-208767 |   | 7/2003 |

* cited by examiner

*Primary Examiner*—David D Davis
(74) *Attorney, Agent, or Firm*—Antonelli, Terry, Stout & Kraus, LLP.

(57) ABSTRACT

An optical disc apparatus includes a main guide shaft and a subsidiary guide shaft disposed so as to guide movement of a sliding base which holds an optical pickup. The optical pickup enables information recording and reproducing operations on an optical disc. The main guide shaft and the subsidiary guide shaft are configured so as to suppress vibrational resonance caused between the main guide shaft and the subsidiary guide shaft.

14 Claims, 6 Drawing Sheets

OPTICAL DISC APPARATUS WITH CONSISTENTLY DIFFERING GUIDE SHAFTS

INCORPORATION BY REFERENCE

The present application claims priority from Japanese application 2005-352554 filed on Dec. 6, 2005, the content of which is hereby incorporated by reference into this application.

BACKGROUND OF THE INVENTION

The present invention relates generally to optical disc apparatuses. More particularly, the invention relates to an optical disc apparatus adoptable for compact discs (CDs), digital versatile discs (DVDs), Blu-ray discs (BDs), and the like, and having a vibration insulator for preventing signal read/write errors from occurring during recording and reproduction.

Conventional optical disc apparatuses have some vibration insulator for preventing signal read/write errors from occurring during recording and reproduction.

For example, the types of vibration insulators employed in optical disc apparatuses for CDs, DVDs, or the like, include one in which the guide shafts themselves and support sections for supporting the guide shafts are each formed of resin.

A main guide shaft and a subsidiary guide shaft exist as the guide shafts that are main constituent elements of an optical disc apparatus. In conventional types of optical disc apparatuses, for reasons of the moving stroke of an optical pickup, both the main guide shaft and the subsidiary guide shaft are typically of the same length. In addition, in terms of cost, the main guide shaft and the subsidiary guide shaft are usually made of the same metallic material and both are usually formed into the same shaft shape.

In recent years, high positioning accuracy has been required for optical disc apparatuses of high recording capacity, such as Blu-ray disc apparatuses. These optical disc apparatuses, compared with conventional ones, are required to have high positioning accuracy particularly in a focusing direction and in a tracking direction.

For example, Japanese Patent Laid-open No. 2000-311366 concerned with this technical field discloses a technique for constructing an optical disc apparatus including first and second bearings supported by a main guide shaft, and a third bearing supported by a subsidiary guide shaft; wherein a supporting point of the third bearing is disposed on a straight line which connects a midpoint on a line segment between supporting points of the first and second bearings and a center of gravity of a sliding base including an optical pickup.

For the conventional optical disc apparatus described above in the "Background of the Invention", however, the disclosure of the technique in Japanese Patent Laid-open No. 2000-311366, for example, does not contain information on a method of preventing or controlling the vibration of the optical pickup or the vibrational resonance of the guide shafts. There has been, therefore, a problem in that the technique alone does not suffice to obtain a sufficient vibration-insulating effect.

Despite the fact that as described above, compared with that of the conventional optical disc apparatuses, high positioning accuracy in the focusing direction and in the tracking direction is required particularly for optical disc apparatuses of high recording capacity, such as Blu-ray disc apparatuses, effective measures for preventing or controlling the vibrational resonance of the main guide shaft and the subsidiary guide shaft have not been taken in conventional techniques.

More specifically, for the conventional optical disc apparatuses, both the main guide shaft and the subsidiary guide shaft are set to the same length for reasons of the stroke of the optical pickup which moves between the inner and outer peripheral edges of a disc. In addition, in terms of cost, the main guide shaft and the subsidiary guide shaft are made of the same metallic material and both are formed into the same shaft shape. Hence, during information recording on or reproduction from the optical disc, that is, during movement of the sliding base itself, the natural frequency of the main guide shaft system including the optical pickup, and the natural frequency of the subsidiary guide shaft system take the same value, for which reason, vibrational resonance occurs between the main guide shaft system and the subsidiary guide shaft. This problem, in turn, causes a further problem in that the vibrational characteristics of the optical pickup in the focusing direction deteriorate under the conditions of those frequencies, and these problems are becoming increasingly prominent in recent years.

SUMMARY OF THE INVENTION

The present invention has been made in view of the above problems associated with the conventional art, and an object of the invention is to provide an optical disc apparatus that can suppress the vibrational resonance caused between a main guide shaft and a subsidiary guide shaft, and prevent an optical pickup from losing control of its focusing and control of its tracking.

Another object of the present invention is to provide an optical disc apparatus which, without significantly changing the conventional manufacturing method, can suppress the vibrational resonance caused between a main guide shaft and a subsidiary guide shaft, and prevent an optical pickup from losing control of its focusing and control of its tracking control.

Yet another object of the present invention is to provide an optical disc apparatus which, even if a main guide shaft and a subsidiary guide shaft are both constructed of the same material, can suppress the vibrational resonance caused between the main guide shaft and the subsidiary guide shaft, and prevent an optical pickup from losing its focus control and its tracking control.

After making energetic studies in consideration of the above problems to be solved, the present inventors arrived at the conclusion that the vibrational resonance of the main guide shaft and subsidiary guide shaft for guiding the sliding base which holds the optical pickup can be suppressed by assigning differences in cross-sectional shape and cross-sectional area between both shafts.

That is to say, the present invention provides an optical disc apparatus that includes rotating means for rotationally driving a mounted disc, a chassis for securing the rotating means, a main guide shaft and subsidiary guide shaft fixed to the chassis approximately in parallel to a radial direction of the disc, and a sliding base for holding an optical pickup which performs information recording and reproducing operations on the disc, a first bearing and a second bearing attached to the sliding base being in engagement with the main guide shaft and the subsidiary guide shaft, respectively, to render the sliding base movable in the radial direction of the disc with respect to the chassis; wherein the main guide shaft and the subsidiary guide shaft are of a cylindrical shape and the main guide shaft has a cross-sectional shape different from that of the subsidiary guide shaft.

Constructing the optical disc apparatus in this way makes it possible to assign a difference in natural frequency between the main guide shaft and the subsidiary guide shaft due to a difference between cross-sectional coefficients of both shafts. Consequently, the vibrational resonance caused between the main guide shaft and the subsidiary guide shaft can be suppressed, which realizes the optical disc apparatus having an ability to prevent the optical pickup from losing its focus control and its tracking control.

The present invention provides another optical disc apparatus that includes rotating means for rotationally driving a mounted disc, a chassis for securing the rotating means, a main guide shaft and subsidiary guide shaft fixed to the chassis in a condition approximately parallel to a radial direction of the disc, and a sliding base for holding an optical pickup which performs information recording and reproducing operations on the disc, a first bearing and a second bearing attached to the sliding base being in engagement with the main guide shaft and the subsidiary guide shaft, respectively, to render the sliding base movable in the radial direction of the disc with respect to the chassis; wherein both the main guide shaft and the subsidiary guide shaft are of a cylindrical shape and the subsidiary guide shaft is of a hollow shaft cross-sectional shape.

Constructing the optical disc apparatus in this way makes it possible to assign a difference in natural frequency between the main guide shaft and the subsidiary guide shaft due to a difference in cross-sectional coefficient between both shafts. Consequently, the vibrational resonance caused between the main guide shaft and the subsidiary guide shaft can be suppressed, which realizes the optical disc apparatus having an ability to prevent the optical pickup from losing its focus control and its tracking control.

In any one of the above optical disc apparatuses according to the present invention, the subsidiary guide shaft has a diameter greater than that of the main guide shaft. In addition, a ratio between the cross-sectional coefficient of the subsidiary guide shaft and that of the main guide shaft is preferably at least 1.4.

The present invention provides yet another optical disc apparatus that includes rotating means for rotationally driving a mounted disc, a chassis for securing the rotating means, a main guide shaft and subsidiary guide shaft fixed to the chassis in a condition approximately parallel to a radial direction of the disc, and a sliding base for holding an optical pickup which performs information recording and reproducing operations on the disc, a first bearing and a second bearing attached to the sliding base being in engagement with the main guide shaft and the subsidiary guide shaft, respectively, to render the sliding base movable in the radial direction of the disc with respect to the chassis; wherein the main guide shaft is of a cylindrical shape, the subsidiary guide shaft is of a cylindrical shape formed with a groove extending axially in a section at which the subsidiary guide shaft is kept free of engagement with the second bearing, and a plate-shaped member to be connected to the chassis is engaged with the groove.

In the optical disc apparatus thus constructed, a vibration-absorbing action of the plate-shaped member makes it possible to suppress the vibrational resonance caused between the main guide shaft and the subsidiary guide shaft. The optical disc apparatus having an ability to prevent the optical pickup from losing its focus control and its tracking control can be realized as a result.

As described above, any one of the optical disc apparatuses according to the present invention is effective in preventing a shift in relative position from occurring between the disc and the pickup, in suppressing the vibrational resonance of the guide shafts including the sliding base, and in preventing disc information recording/reproducing errors from occurring. Also, manufacturing processes for the conventional optical disc apparatuses can be used to realize the optical disc apparatus having the above advantageous effects, so this apparatus has an effect that it requires no additional equipment costs. In addition, this apparatus can be realized using the same material for the main guide shaft and the subsidiary guide shaft, so the apparatus has effects that it enhances reliability and that it can save materials costs.

BRIEF DESCRIPTION OF THE DRAWINGS

Other objects and advantages of the invention will become apparent from the following description of embodiments with reference to the accompanying drawings in which.

DETAILED DESCRIPTION OF THE PREFERRED EMBODIMENTS

Preferred embodiments of an optical disc apparatus of the present invention will be described hereunder referring to the accompanying drawings. FIGS. 1 to 9 show embodiments of the present invention, in which figures, the sections assigned the same reference number or symbol denote the same constituent elements and each embodiment assumes the same in basic configuration and operation.

First Embodiment

Figure 1:
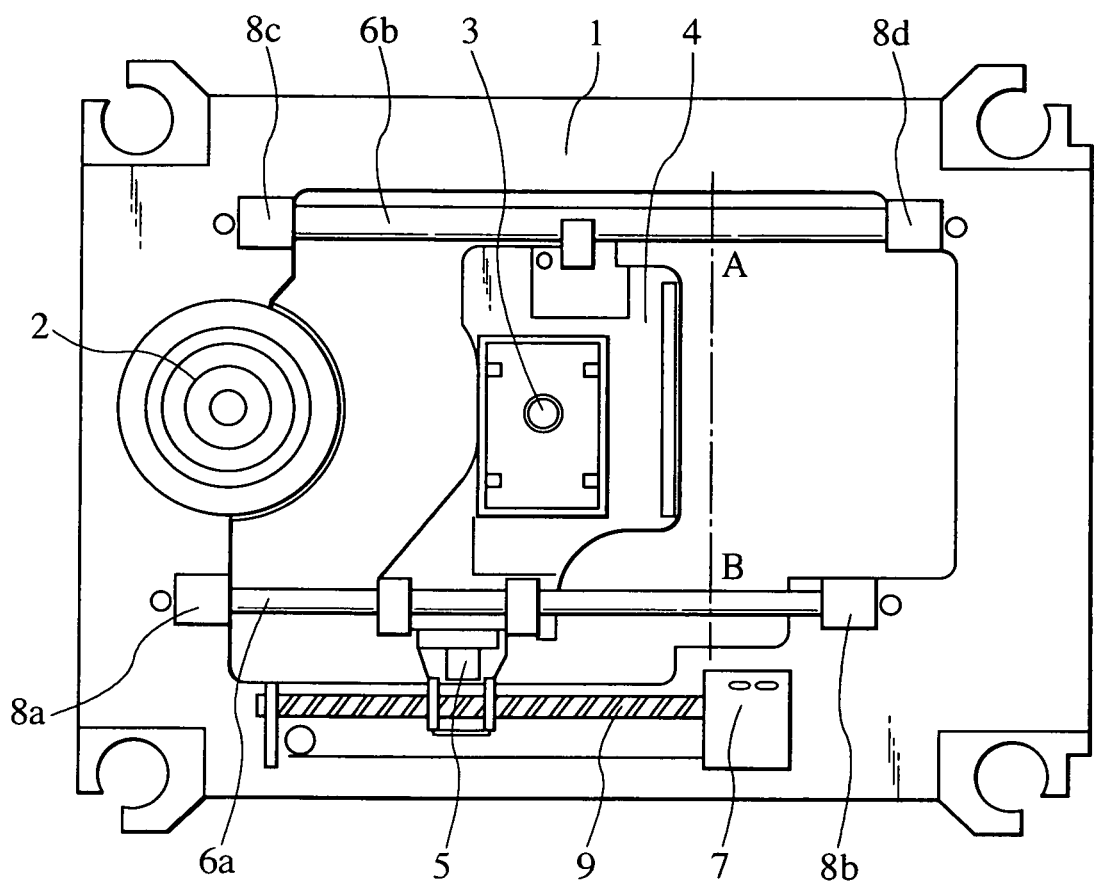
FIG. 1 is a plan view showing a total configuration of an optical disc apparatus according to a first embodiment of the present invention.

FIG. 1 is a plan view showing a total configuration of an optical disc apparatus according to a first embodiment of the present invention. The optical disc apparatus of the present embodiment in FIG. 1 includes: a chassis 1 which functions as a base material to support other constituent elements in their entirety; a spindle motor 2 for rotating an optical disc; an optical pickup 3; a sliding base 4 including the optical pickup 3; a guide rack 5 with a moving mechanism for the sliding base 4; a main guide shaft 6a which guides movement of the optical pickup 3; a subsidiary guide shaft 6b, being parallel to the main guide shaft 6a, which works together with the main guide shaft 6a to guide the movement of the optical pickup 3; a feed motor 7 which generates a driving force to move the sliding base 4; guide supports 8a, 8b which support the main guide shaft 6a in an adjusted fashion at a desired position and in a desired posture/attitude; guide supports 8c, 8d which support the subsidiary guide shaft 6b in an adjusted fashion at a desired position and in a desired posture/attitude; and a feed screw 9 which transmits the driving force of the feed motor 7 to the guide rack 5.

The main guide shaft 6a has a cylindrical shape, is in engagement with the side of the sliding base 4 that faces the guide rack 5, and guides movement of the optical pickup 3 in a radial direction of the optical disc. The subsidiary guide shaft 6b has a cylindrical shape and is in engagement with the section of the sliding base 4 that is opposite to the side at which the guide rack 5 is installed. The subsidiary guide shaft 6b cooperates with the main guide shaft 6a to guide the movement of the optical pickup 3 in the radial direction of the optical disc. The feed screw 9 is rotationally driven by the feed motor 7, thus transmitting the driving force of the feed motor 7 to the guide rack 5. That is to say, the main guide shaft 6a is located closer to the feed screw 9 than the location of the subsidiary guide shaft 6b with respect to the feed screw 9.

The chassis 1, the optical pickup 3, the main guide shaft 6a, and the subsidiary guide shaft 6b are each constructed of a metallic material. The same kind of material can be used to construct the main guide shaft 6a and the subsidiary guide shaft 6b. The guide supports 8a, 8b, 8c, 8d are each constructed of a resin material.

Figure 2:
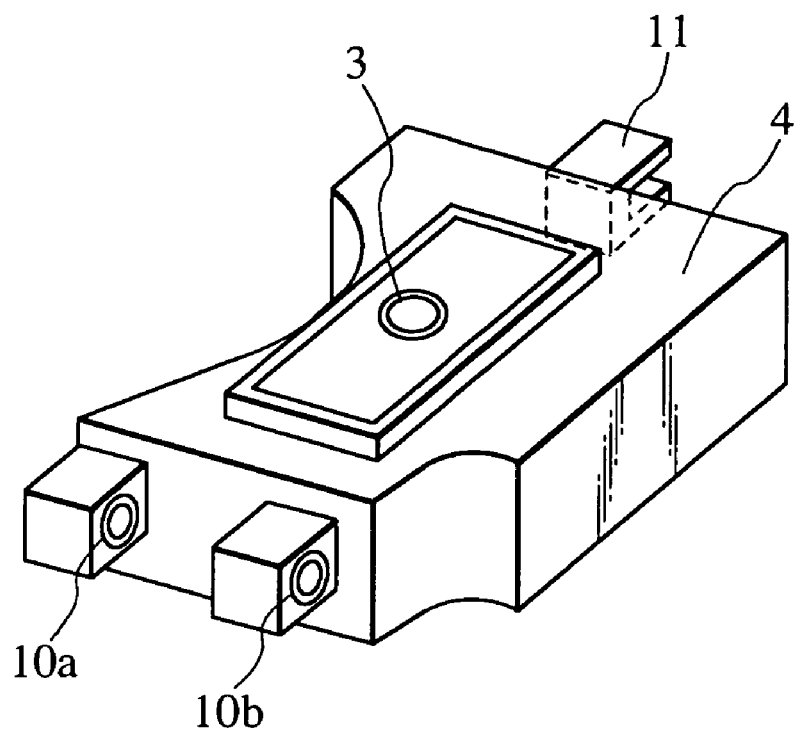
FIG. 2 is a perspective view showing a configuration of a sliding base in the optical disc apparatus according to the first embodiment of the present invention.

FIG. 2 is a perspective view showing a configuration of the sliding base 4 in the optical disc apparatus according to the first embodiment of the present invention. In FIG. 2, the sliding base 4 has two first bearings 10a, 10b and one second bearing 11. The first bearings 10a, 10b both have a holed shape to make the main guide shaft 6a extend through the holes, and thus, vertical and horizontal movements of the main guide shaft 6a can be restricted. As shown in FIG. 2, the second bearing 11 is of a rectangle with one side open, and its inner diameter is set to a value greater than the diameter of the subsidiary guide shaft, whereby the guide supports 8c, 8d can adjust the subsidiary guide shaft 6b to the desired position and to the desired posture/attitude.

Figure 3:
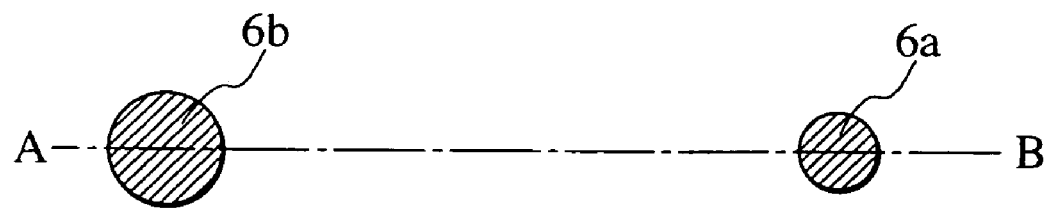
FIG. 3 is a sectional view that shows section A-B of a main guide shaft and subsidiary guide shaft in the optical disc apparatus according to the first embodiment of the present invention.

FIG. 3 is a cross-sectional view that shows section A-B of the main guide shaft and subsidiary guide shaft in the optical disc apparatus according to the first embodiment of the present invention. As can be seen from the sectional view of FIG. 3 that shows section A-B of the main guide shaft and subsidiary guide shaft in the optical disc apparatus of FIG. 1, the present embodiment is constructed so that the diameter of the subsidiary guide shaft 6b is greater than that of the main guide shaft 6a.

Figure 4A:
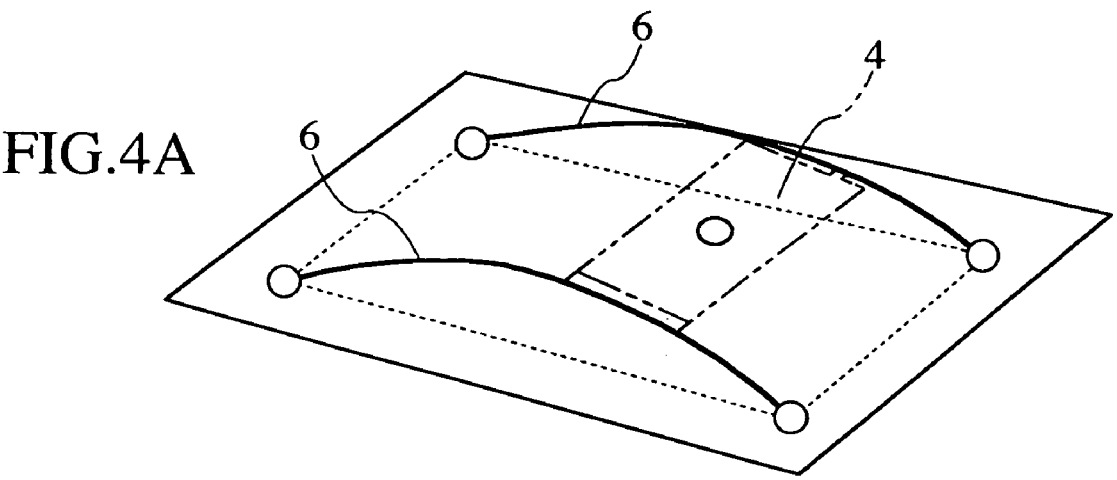
FIGS. 4A and 4B are explanatory views that show different deformation modes of guide shaft resonance in the optical disc apparatus according to the first embodiment of the present invention, FIG. 4A being an in-phase deformation mode diagram of first-order guide shaft resonance, and FIG. 4B being an antiphase deformation mode diagram of second-order guide shaft resonance.
Figure 4B:
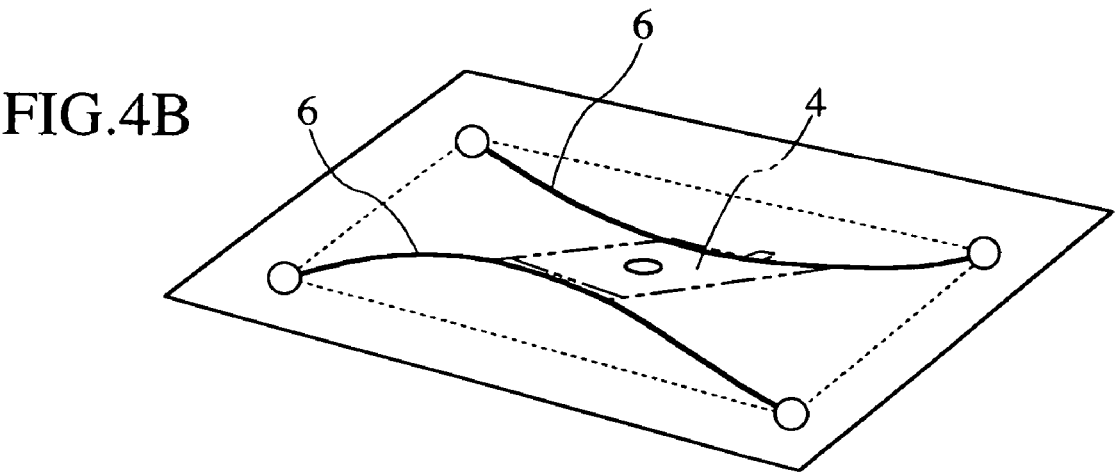

FIGS. 4A and 4B are explanatory diagrams that show different deformation modes of guide shaft resonance in the optical disc apparatus according to the first embodiment of the present invention. FIG. 4A is an in-phase deformation mode diagram of first-order guide shaft resonance, and FIG. 4B is an antiphase deformation mode diagram of second-order guide shaft resonance.

If the main guide shaft 6a and the subsidiary guide shaft 6b are of the same cross-sectional shape, the first-order guide shaft resonance occurring during information recording on/reproduction from the optical disc, that is, during movement of the sliding base 4, will be as shown in the in-phase deformation mode diagram of FIG. 4A. Also, the second-order guide shaft resonance occurring during the movement of the sliding base 4 will be as shown in the antiphase deformation mode diagram of FIG. 4B.

The regions denoted by a broken line in FIGS. 4A and 4B indicate a section in which the sliding base 4 is present. During the movement of the sliding base 4, the guide shafts including the sliding base 4 exhibit the greatest amplitude when suffering from in-phase deformation or antiphase deformation. The deformation with the greatest amplitude augments relative displacement between the optical pickup and the disc, thus causing loss of servo control. The present embodiment is intended to solve the problem of servo control being lost.

More specific operation of the optical disc apparatus according to the present embodiment will be described hereunder.

For the optical disc apparatus according to the present embodiment, the subsidiary guide shaft 6b does not resonate at a resonance frequency of the main guide shaft 6a. That is to say, a functional feature of the optical disc apparatus according to the present embodiment exists in that the cross-sectional coefficient of the main guide shaft 6a and that of the subsidiary guide shaft 6b are made different to achieve the difference in natural frequency between both shafts. More specifically, for a cylindrical guide shaft, cross-sectional coefficient Z of the particular guide shaft is typically expressed by the following formula with a diameter of the guide shaft taken as "d":

$$Z = \pi \cdot d^4 / 64 \qquad \text{(Formula 1)}$$

If the cross-sectional coefficient of the main guide shaft 6a is taken as $Z1(=1)$ and the cross-sectional coefficient of the subsidiary guide shaft 6b as $Z2$, the optical disc apparatus according to the present embodiment is constructed so that a ratio of $Z2/Z1$ is at least 1.4.

Figure 5:
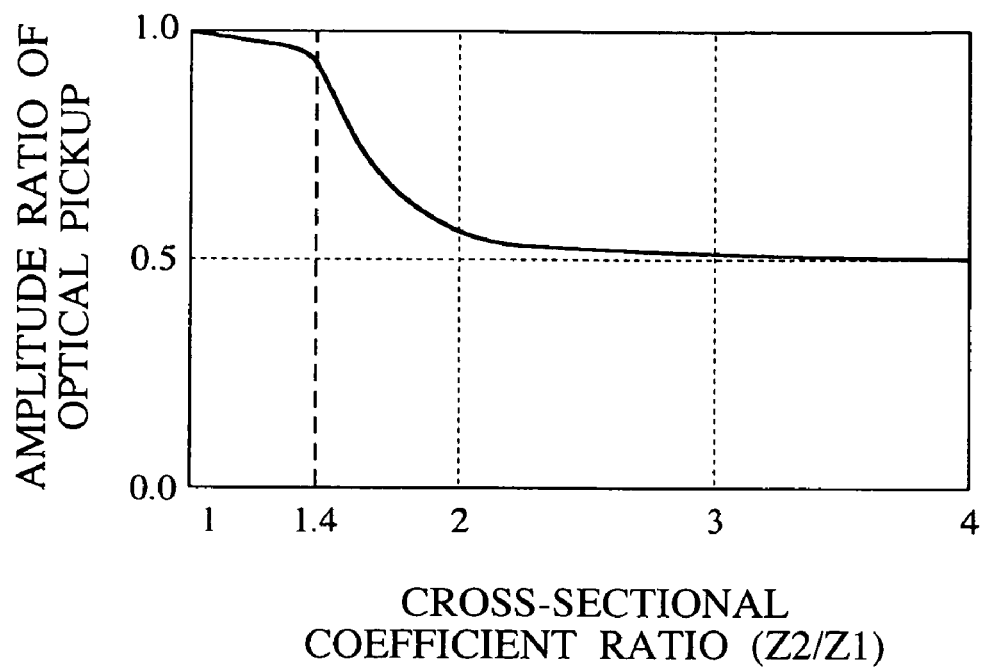
FIG. 5 is a graph representing the relationship between a cross-sectional coefficient ratio of the main guide shaft and subsidiary guide shaft in the optical disc apparatus according to the first embodiment, and amplitude of an optical pickup.

Amplitude of the optical pickup 3 in the above-constructed optical disc apparatus according to the present embodiment is described below. FIG. 5 is a graph representing the relationship between the cross-sectional coefficient ratio of the main guide shaft and subsidiary guide shaft in the optical disc apparatus according to the present embodiment, and the amplitude of the optical pickup. The horizontal axis shown in FIG. 5 denotes the ratio between the cross-sectional coefficient of the main guide shaft 6a and that of the subsidiary guide shaft 6b, and the vertical axis shown denotes an amplitude ratio of the optical pickup.

In FIG. 5, the amplitude ratio of the optical pickup 3 is set equal to 1, which applies if the main guide shaft 6a and the subsidiary guide shaft 6b are equal in cross-sectional coefficient to each other, that is, if the diameter of the main guide shaft 6a and that of the subsidiary guide shaft 6b are equal to each other as in the conventional art. As shown in FIG. 5, increases in the cross-sectional coefficient ratio Z2/Z1 reduce the amplitude ratio of the optical pickup, and as a result, the amplitude ratio of the optical pickup asymptotically approaches 0.5. It is to be understood that a reduction rate of the optical pickup's amplitude ratio increases particularly at and after a section at which the cross-sectional coefficient ratio between the main guide shaft 6a and the subsidiary guide shaft 6b increases above 1.4. Hence, adopting an apparatus construction for a cross-sectional coefficient ratio of at least 1.4 between the main guide shaft 6a and the subsidiary guide shaft 6b makes it possible to reduce amplitudes of the main guide shaft 6a and the subsidiary guide shaft 6b during resonance thereof. Consequently, it is also possible to suppress vibration of the optical pickup and to prevent this pickup from losing its focus control, its tracking control, and the like. If the cross sections of the guide shafts are of cylindrical shape, a ratio of a diameter of the subsidiary guide shaft 6b to a diameter of the main guide shaft 6a is preferably equal to or greater than 1.088 based on Z=1.4 or Z>1.4, and more preferably, equal to or greater than 1.189, based on Z=2.0 or Z>2.0, which is more preferable as FIG. 5 shown, according to Formula 1.

In addition, since contact between the subsidiary guide shaft 6b and the second bearing 11 occurs at one section only, the foregoing construction of the optical disc apparatus according to the present embodiment permits the subsidiary guide shaft 6b to be enlarged in cross-sectional shape and thus the second bearing 11 to be reduced in surface pressure. Adopting such a construction for the actually enlarged cross-sectional shape of the subsidiary guide shaft 6b, therefore, improves sliding characteristics of the sliding base 4 during axial movement thereof, even making it possible to provide a highly reliable optical disc apparatus.

As set forth above, the optical disc apparatus of the present embodiment can cause the main guide shaft 6a and the subsidiary guide shaft 6b to take different values in natural frequency. The apparatus is therefore effective in suppressing the resonance of both shafts and the vibration of the optical pickup, and thus in preventing this pickup from losing its focus control, its tracking control, and the like.

Second Embodiment

In terms of total configuration, an optical disc apparatus according to a second embodiment of the present invention is essentially the same as the optical disc apparatus of the first embodiment, shown in FIG. 1. The optical disc apparatus according to the second embodiment, however, is characterized in that a main guide shaft 12a has a diameter greater than that of the main guide shaft 6a in the first embodiment and in that unlike the subsidiary guide shaft 6b in the first embodiment, a subsidiary guide shaft 12b is of a hollow shaft shape.

Figure 6:
FIG. 6 is a sectional view that shows section A-B of a main guide shaft and subsidiary guide shaft in an optical disc apparatus according to a second embodiment of the present invention.

FIG. 6 is a sectional view that shows section A-B of the main guide shaft and subsidiary guide shaft in the optical disc apparatus according to the second embodiment of the present invention. As shown in FIG. 6, the optical disc apparatus of the present embodiment is constructed so that the subsidiary guide shaft 12b is hollow in cross-sectional shape and greater than the main guide shaft 12a in diameter. Constructing the apparatus in this fashion makes a difference between cross-sectional coefficients of the main guide shaft 12a and the subsidiary guide shaft 12b, thus making it possible for both shafts to take different values as their natural frequencies. Accordingly, it becomes possible to suppress resonance of both the main guide shaft 12a and the subsidiary guide shaft 12b and vibration of an optical pickup, and hence as in the first embodiment, to prevent the optical pickup from losing its focus control, its tracking control, and the like. In addition, the hollow cross-sectional shaft shape of the subsidiary guide shaft 12b allows weight reduction thereof, which, in turn, contributes to weight reduction of the entire apparatus.

The same kind of metallic material can be used to construct the main guide shaft 12a and the subsidiary guide shaft 12b. Additionally, while the main guide shaft 12a and subsidiary guide shaft 12b in FIG. 6 differ from each other in diameter, both shafts can also be constructed to have the same diameter. This is because, even if both shafts are of the same diameter, the cross-sectional coefficients of both take different values since the subsidiary guide shaft 12b is hollow in shape.

Third Embodiment

Figure 7:
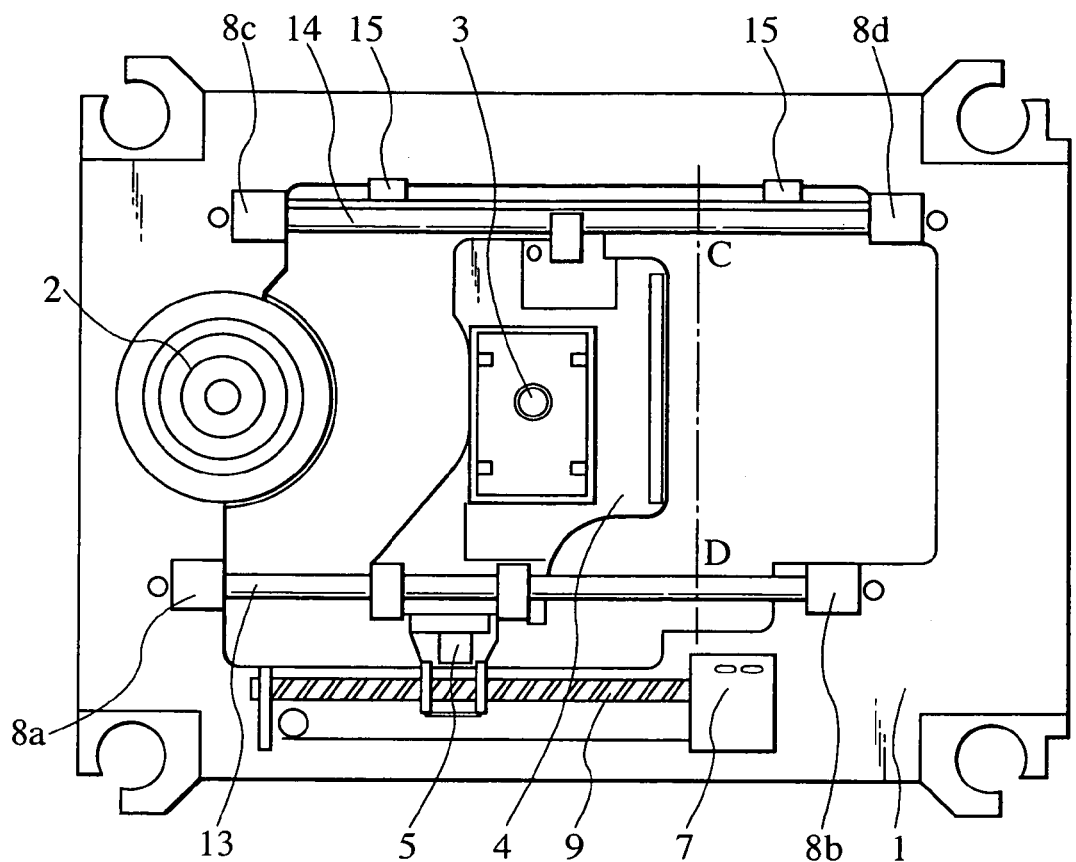
FIG. 7 is a configuration diagram showing a total configuration of an optical disc apparatus according to a third embodiment of the present invention.

FIG. 7 is a configuration diagram showing a total configuration of an optical disc apparatus according to a third embodiment of the present invention. As shown in FIG. 7, the optical disc apparatus according to the third embodiment of the present embodiment includes a main guide shaft 13 and a subsidiary guide shaft 14 in lieu of the main guide shaft 6a and subsidiary guide shaft 6b, respectively, used in the optical disc apparatus according to the first embodiment of the present invention. The optical disc apparatus according to the third embodiment also has connectors 15 between a chassis 1 and the subsidiary guide shaft 14. Description is omitted of other sections functionally and structurally overlapping those of FIG. 1. The same kind of metallic material can be used to construct the main guide shaft 13 and the subsidiary guide shaft 14.

Figure 8:
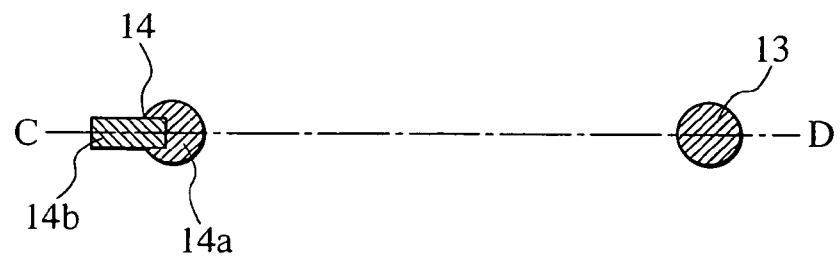
FIG. 8 is a sectional view that shows section C-D of a main guide shaft and subsidiary guide shaft in the optical disc apparatus according to the third embodiment of the present invention.

FIG. 8 is a sectional view that shows section C-D of the main guide shaft and subsidiary guide shaft in the optical disc apparatus according to the third embodiment of the present invention. The main guide shaft 13 in FIG. 8 is of a cylindrical shape. The main guide shaft 13 and the subsidiary guide shaft 14 are constructed using a metallic material. The main guide shaft 13 is engaged with the side of a sliding base 4 that faces a guide rack 5, and thus the main guide shaft 13 guides movement of an optical pickup 3 in a radial direction of an optical disc. The subsidiary guide shaft 14 is engaged with the section of the sliding base 4 that is opposite to the side at which the guide rack 5 is installed. The subsidiary guide shaft 14 cooperates with the main guide shaft 13 to guide the movement of the optical pickup 3 in the radial direction of the optical disc.

Figure 9:
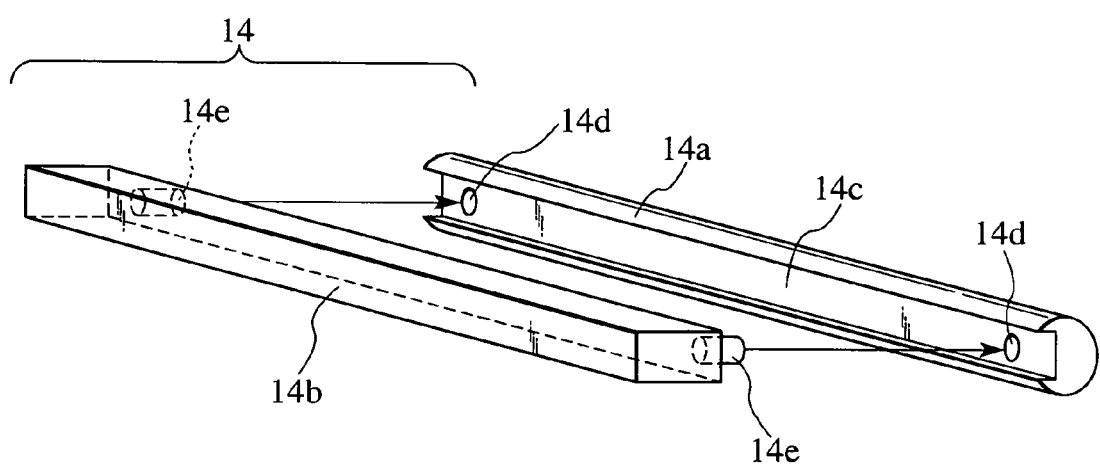
FIG. 9 is an assembly diagram of the subsidiary guide shaft in the optical disc apparatus according to the third embodiment of the present invention.

FIG. 9 is an assembly diagram of the subsidiary guide shaft in the optical disc apparatus according to the third embodiment of the present invention. As shown FIG. 9, the subsidiary guide shaft 14 includes a cylindrically shaped structural member 14a and a plate-shaped member 14b, both of which are the same as those of the main guide shaft 13 in terms of diameter. An axially horizontal groove 14c and a pair of coupling holes 14d for bringing the plate-shaped member 14b into engagement with the groove 14c are formed on the opposite-side face of the cylindrically shaped structural member 14a that is opposed to the main guide shaft 13. The plate-shaped member 14b has pins 14e arranged thereon. The connection holes 14d and the associated pins 14e are engaged to form the subsidiary guide shaft 14. The cylindrically shaped structural member 14a and the plate-shaped member 14b are constructed of a metallic material. The connectors 15 are each formed of a resin material.

Functionality of the optical disc apparatus according to the present embodiment will be described hereunder.

A cross-sectional coefficient of the subsidiary guide shaft 14 is increased above that of the main guide shaft 13. That is to say, if the main guide shaft has a diameter of "d" and the plate-shaped member 14b of the subsidiary guide shaft 14 has a plate thickness of "h", and a length of L, at a protruding section, cross-sectional coefficient Z3 of the subsidiary guide shaft 14 is denoted by formula (2).

$$Z3 = L \cdot h/12 + \pi \cdot d^4/64 \qquad \text{(Formula 2)}$$

In other words, a cross-sectional coefficient of the subsidiary guide shaft 14 can be set a value greater than that of the main guide shaft 13.

In addition, the connectors 15 connect with the subsidiary guide shaft 14 at least one section, and as mentioned above, the connectors are made of resin. When the subsidiary guide shaft 14 vibrates, therefore, the connectors 15 absorb and attenuate the vibration. Thus, the apparatus is effective in suppressing vibration of the optical pickup as well, and thus in preventing this pickup from losing its focus control, its tracking control, and the like.

In the optical disc apparatus of the present embodiment, the cylinder-shaped structural member 14a and the plate-shaped member 14b configure the subsidiary guide shaft 14. However, the present invention is not limited to this configuration. For example, even if the subsidiary guide shaft 14 takes a configuration in which it is integrally formed of a metallic material, it is possible to obtain essentially the same effects as those described above.

While specific embodiments of the optical disc apparatus of the present invention have been described above, the invention is not limited to these embodiments. Any person skilled in the art can introduce various modifications/improvements in the configuration and functionality of the present invention according to each of the above embodiments or any other embodiments, without departing from the scope of the invention.

The present invention can be applied to realization of optical disc apparatuses, and more particularly to realizing compact disc, digital versatile disc, and Blu-ray disc types of optical disc apparatuses.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An optical disc apparatus comprising:
   a main guide shaft and a subsidiary guide shaft disposed so as to guide movement of a sliding base which holds an optical pickup, the optical pickup enabling information recording and reproducing operations on an optical disc;
   wherein at least one of area and shape of cross-sections of the main guide shaft differ consistently along the length of the main guide shaft from corresponding cross-sections of the subsidiary guide shaft along the length thereof, such that the main guide shaft has a vibrational resonance frequency which differs from a vibrational resonance frequency of the subsidiary guide shaft, resulting in suppressed vibrational resonance.

2. The optical disc apparatus according to claim 1, wherein the main guide shaft and the subsidiary guide shaft are of a cylindrical shape, and differ from each other in area of cross-section.

3. The optical disc apparatus according to claim 2, wherein the subsidiary guide shaft has a diameter at least 1.088 times greater than a diameter of the main guide shaft.

4. The optical disc apparatus according to claim 1, wherein the subsidiary guide shaft has a hollow shaft cross-sectional shape.

5. The optical disc apparatus according to claim 1, wherein a ratio between a cross-sectional coefficient of the subsidiary guide shaft and a cross-sectional coefficient of the main guide shaft is at least 1.4.

6. The optical disc apparatus according to claim 5, wherein the ratio between the cross-sectional coefficient of the subsidiary guide shaft and the cross-sectional coefficient of the main guide shaft is at least 2.0.

7. The optical disc apparatus according to claim 1, wherein the main guide shaft and the subsidiary guide shaft are disposed in parallel to one another.

8. The optical disc apparatus according to claim 7, further comprising:
   a feed screw which receives a driving force from a feed motor so as to move the sliding base in a radial direction of the optical disc;
   wherein the main guide shaft is located closer to the feed screw than a location of the subsidiary guide shaft with respect to the feed screw.

9. The optical disc apparatus according to claim 8, further comprising:
   a first bearing and a second bearing attached to the sliding base, the first bearing being in engagement with the main guide shaft and the second bearing being in engagement with the subsidiary guide shaft.

10. The optical disc apparatus according to claim 1, further comprising:
    a motor for rotationally driving the optical disc;
    a chassis for securing the motor;
    a first bearing and a second bearing attached to the sliding base, the first bearing being in engagement with the main guide shaft and the second bearing being engagement with the subsidiary guide shaft;
    wherein the main guide shaft has a cylindrical shape; and
    wherein the subsidiary guide shaft has a substantially cylindrical shape with a groove extending in an axial direction of the subsidiary guide shaft, and a plate-shaped member which is connectable to the chassis being disposed within the groove and arranged so as to be free of contact with the second bearing.

11. The optical disc apparatus according to claim 1, further comprising:
    a plurality of guide supports, used to support the main guide shaft and the subsidiary guide shaft;
    wherein the guide supports are comprised of a resin material; and
    wherein the main guide shaft and the subsidiary guide shaft consist of a same non-insulated metallic material.

12. The optical disc apparatus according to claim 1, wherein cross-sections of the main guide shaft consistently differ from corresponding cross-sections of the subsidiary guide shaft along the length thereof in at least one of shaft diameter, size of through-hole, lack of through-hole, size of attached plate-shaped member, and lack of attached plate-shaped member.

13. An optical disc apparatus comprising:
    a main guide shaft and a subsidiary guide shaft disposed so as to guide movement of a sliding base which holds an optical pickup, the optical pickup enabling information recording and reproducing operations on an optical disc;
    wherein a cross-section of the main guide shaft differs in at least one of area and shape from a cross-section of the subsidiary guide shaft, such that the main guide shaft has a vibrational resonance frequency which differs from a vibrational resonance frequency of the subsidiary guide shaft, resulting in suppressed vibrational resonance;
    wherein a ratio between a cross-sectional coefficient of the subsidiary guide shaft and a cross-sectional coefficient of the main guide shaft is at least 1.4.

14. The optical disc apparatus according to claim 13, wherein at least one of area and shape of cross-sections of the main guide shaft differ consistently along the length of the main guide shaft from corresponding cross-sections of the subsidiary guide shaft along the length thereof.

* * * * *